United States Patent
Olsson et al.

(10) Patent No.: US 10,266,211 B2
(45) Date of Patent: Apr. 23, 2019

(54) SPARE WHEEL CAVITY

(71) Applicant: Volvo Car Corporation, Gothenburg (SE)

(72) Inventors: Lars-Eric Olsson, Sjuntorp (SE); Rashad Kadhim, Gothenburg (SE); Erik Land, Skene (SE); Henrik Ebbinger, Vallda (SE); Mattias Andersson, Harestad (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 15/637,278

(22) Filed: Jun. 29, 2017

(65) Prior Publication Data

US 2018/0050734 A1    Feb. 22, 2018

(30) Foreign Application Priority Data

Aug. 22, 2016   (EP) .................................... 16185078

(51) Int. Cl.
| | | |
|---|---|---|
| *B62D 43/10* | (2006.01) | |
| *B62D 25/20* | (2006.01) | |
| *B62D 21/15* | (2006.01) | |

(52) U.S. Cl.
CPC ....... *B62D 25/2072* (2013.01); *B62D 21/152* (2013.01); *B62D 43/10* (2013.01); *B62D 25/20* (2013.01)

(58) Field of Classification Search
CPC ... B62D 25/2072; B62D 21/152; B62D 43/10
USPC ........................................... 296/37.2, 187.11
See application file for complete search history.

(56) References Cited

U.S. PATENT DOCUMENTS

| | | | |
|---|---|---|---|
| 6,854,543 | B2* | 2/2005 | Rowley et al. |
| 9,007,021 | B2* | 4/2015 | Hara et al. |
| 2011/0156431 | A1* | 6/2011 | Souma et al. |
| 2016/0250915 | A1 | 9/2016 | Kobukata et al. |

FOREIGN PATENT DOCUMENTS

| | | |
|---|---|---|
| DE | 9320701 U1 | 1/1995 |
| DE | 19536511 C1 | 11/1996 |
| DE | 19834134 A1 | 2/2002 |
| DE | 102006050750 A1 | 4/2008 |
| JP | 2006256464 A | 9/2006 |
| WO | 2015063839 A1 | 5/2015 |

* cited by examiner

*Primary Examiner* — Joseph D. Pape
(74) *Attorney, Agent, or Firm* — Snyder, Clark, Lesch & Chung, LLP

(57) ABSTRACT

The present disclosure relates to a spare wheel cavity for a vehicle. The spare wheel cavity is configured to store a collision-sensitive object and comprises a bottom wall and a side wall. The spare wheel cavity further comprises a carrier plate directly or indirectly attached to the bottom wall and a reinforcement structure located in or at the bottom wall in front of the carrier plate and/or below a front portion of the carrier plate. The carrier plate is configured to carry the collision-sensitive object on an object carrying portion of the carrier plate. The disclosure further relates to an arrangement comprising the spare wheel cavity, as well as a collision-sensitive object and/or a spare wheel. The disclosure also relates to a method of reducing a risk of a stack-up problem in case of a rear collision.

17 Claims, 8 Drawing Sheets

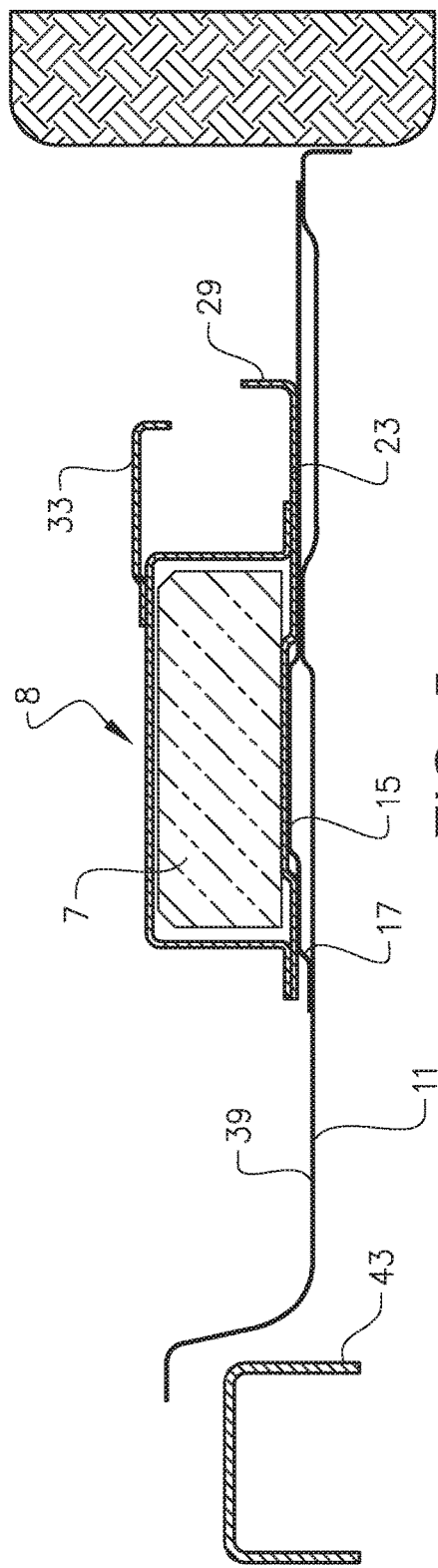
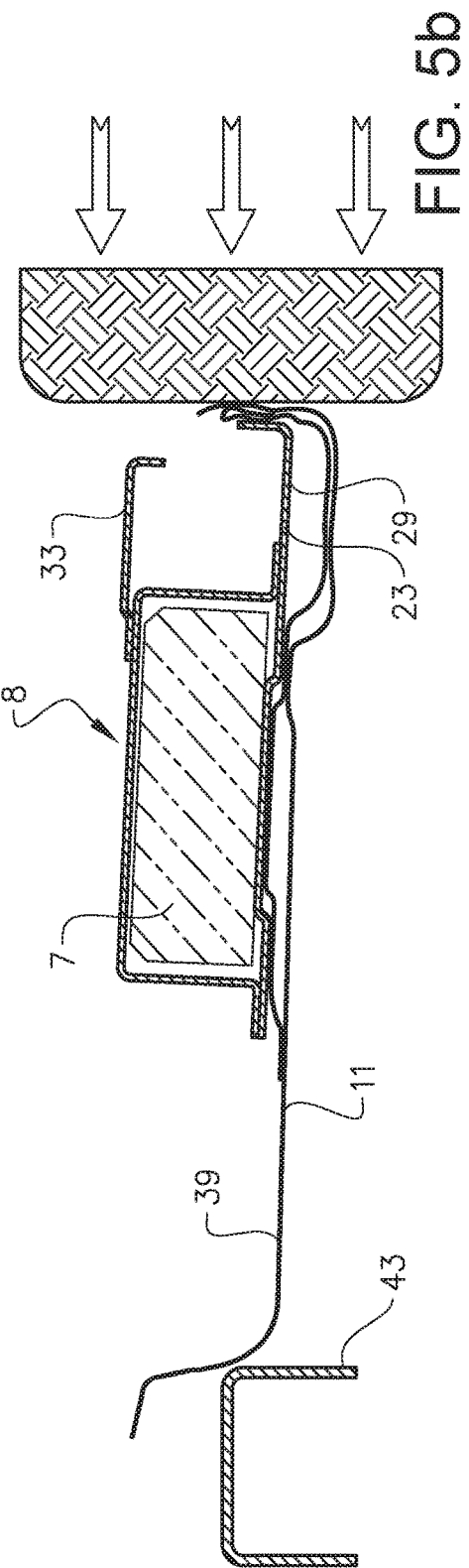

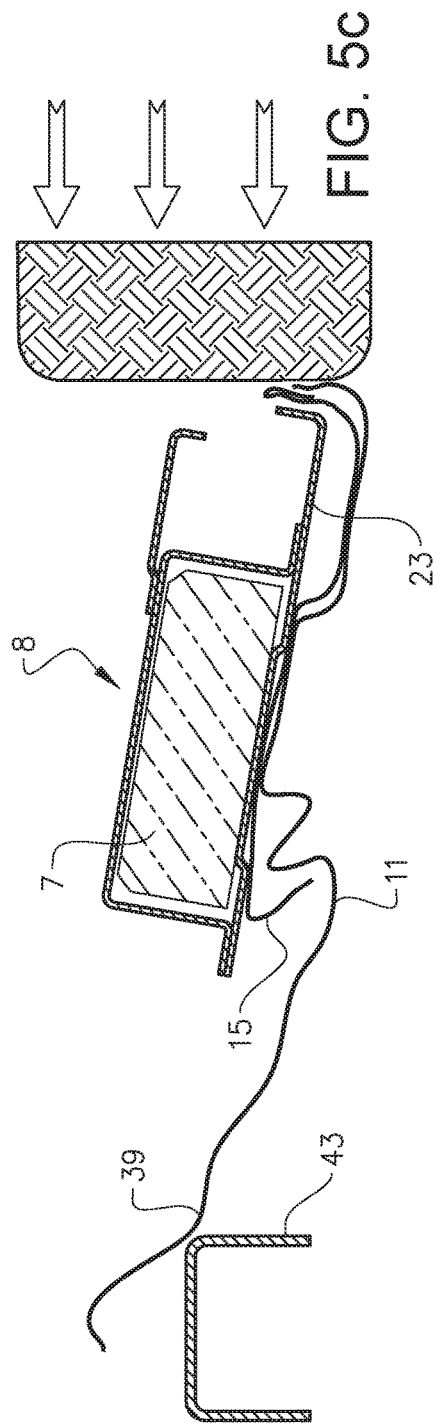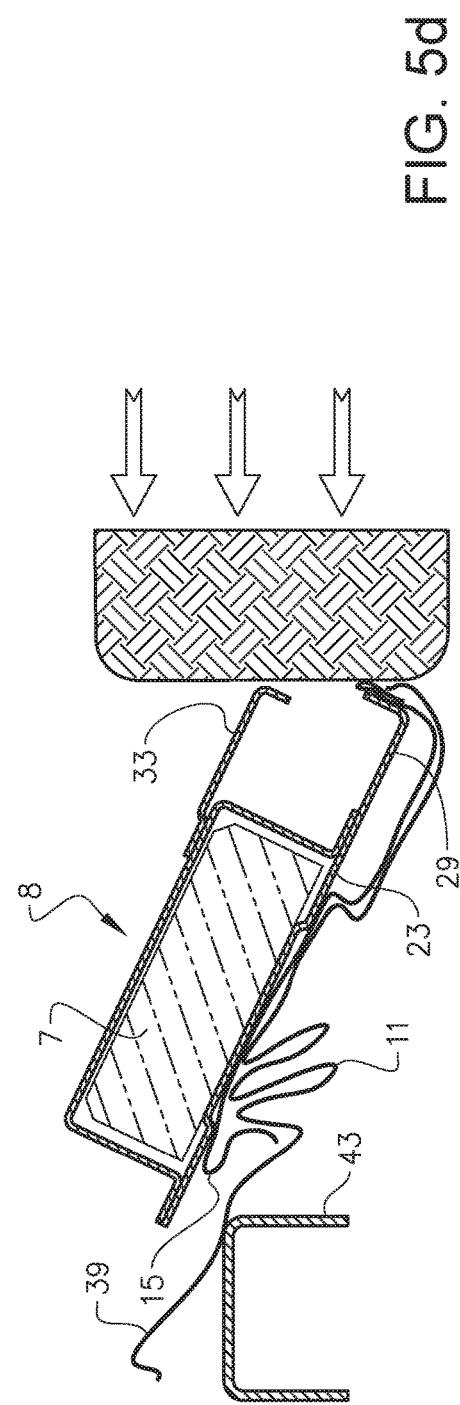

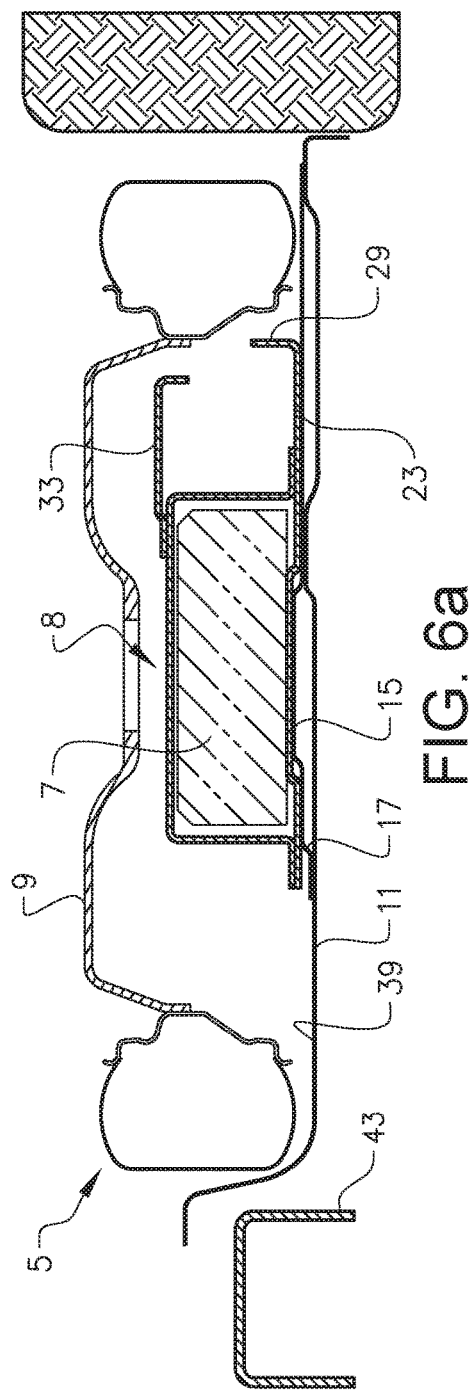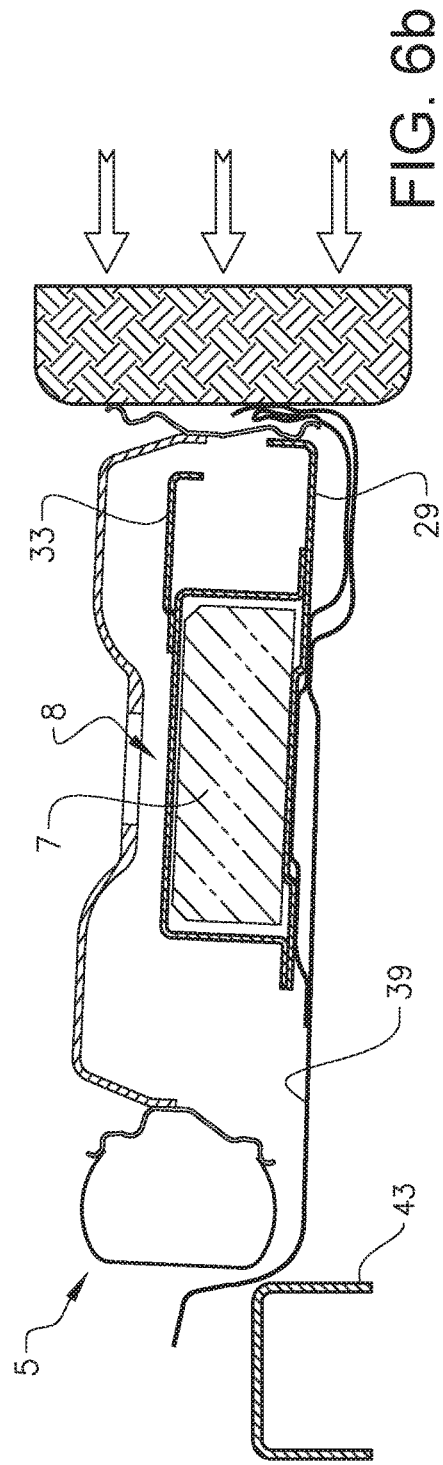

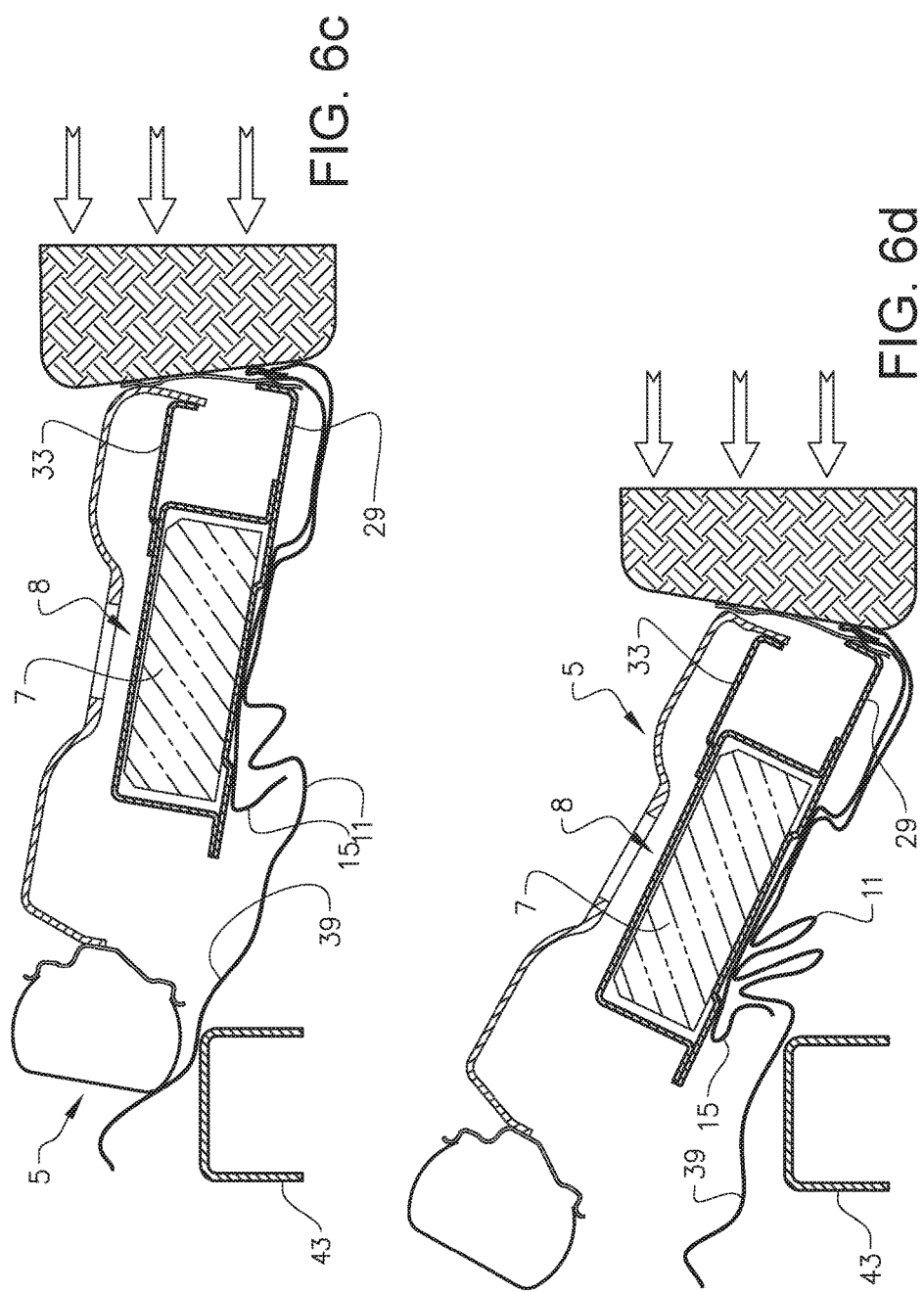

SPARE WHEEL CAVITY

RELATED APPLICATION

This application claims priority under 35 U.S.C. § 119 based on European Patent Application No. 16185078.9, filed Aug. 22, 2016, the disclosure of which is hereby incorporated by reference herein.

TECHNICAL FIELD

The present disclosure relates to a spare wheel cavity for a vehicle. The disclosure further relates to an arrangement comprising the spare wheel cavity, as well as a collision-sensitive object and/or a spare wheel. The disclosure also relates to a method of reducing a risk of a stack-up problem in case of a rear collision.

BACKGROUND

A vehicle, such as a car, is often provided with a spare wheel cavity configured to house a spare wheel. The spare wheel cavity may also be utilized for storing other objects than the spare wheel.

However, if utilizing a spare wheel cavity according to prior art, there would be a risk in case of a rear collision that the spare wheel and/or another object stored in the spare wheel cavity could get stuck against a structural element of the vehicle, such as a rear cross member, thereby potentially causing a stack-up.

Document JP2006256464A discloses a vehicle body rear structure which allows a control of the movement of a spare wheel upon a vehicle body collision. A controller predicts a collision with another vehicle on the basis of data input from a radar, etc. Upon predicting the collision, the controller causes a shifter to jump the vehicle body front side of the spare wheel upward against the vehicle body, at which an extension of the shaft of a spare wheel cramp extends. When another vehicle actually collides against the rear of the vehicle body, the spare wheel is pushed to move it from a retreat position toward the vehicle body front, and a vulnerable part of the shaft of the spare wheel cramp comes to break. As a result, the spare wheel passes over the structural element of the vehicle, such as the rear cross member, thereby reducing or avoiding a risk of a stack-up.

Document DE9320701U1 discloses a vehicle with a battery arranged in a wheel rim of the spare wheel. The battery has a shape adapted to the cavity in the wheel rim, e.g. having a cylindrical shape. However, DE9320701U1 does not describe what happens if the vehicle is involved in a rear collision.

There is thus a desire to provide a spare wheel cavity which works in a rear crash scenario, such the risk of a stack-up is reduced or avoided. This is also the case if the spare wheel cavity is utilized for storing other objects than the spare wheel, e.g. a battery.

SUMMARY

Embodiments of the present disclosure overcome or ameliorate at least one of the disadvantages of the prior art, or to provide a useful alternative.

One or more of the aspects of the invention may be achieved with a spare wheel cavity in accordance with claim 1, an arrangement in accordance with claim 16 or 17 or a method in accordance with claim 17. Further embodiments are set out in the dependent claims, in the following description and in the drawings.

The spare wheel cavity as disclosed herein is configured to store a collision-sensitive object and comprises a bottom wall and a side wall. The spare wheel cavity further comprises a carrier plate directly or indirectly attached to the bottom wall and a reinforcement structure located in or at the bottom wall in front of the carrier plate and/or below a front portion of the carrier plate. The carrier plate is configured to carry the collision-sensitive object on an object carrying portion of the carrier plate.

The spare wheel cavity is configured to be able to receive and store a spare wheel, often in a horizontal orientation. The spare wheel cavity is located at a rear portion of the vehicle. The spare wheel cavity has a shape and a size, which are large enough for the spare wheel to fit into the spare wheel cavity. According to the invention, the spare wheel cavity is further configured to store a collision-sensitive object, e.g. a battery, such as a lithium-ion battery. The collision-sensitive object may be stored inside a wheel rim of the spare wheel, or it may be stored in the spare wheel cavity without a spare wheel. It would also be possible to only have the spare wheel and no collision-sensitive object in the spare wheel cavity. The spare wheel cavity is often covered by a trunk floor panel to provide a flat floor.

The spare wheel cavity as disclosed herein is highly versatile and would work with or without the collision-sensitive object, as well as, with or without the spare wheel. Hence the same kind of configuration of the spare wheel cavity may be used for vehicles being equipped in different ways.

Terms regarding directions and locations as used herein, such as rear, front, forwards and rearwards, relate to when the spare wheel cavity is mounted in the vehicle, which is assumed to stand on a flat ground or surface.

The spare wheel cavity comprises a bottom wall and a side wall. The side wall surrounds the bottom wall. The bottom wall often extends substantially horizontally and the side wall extends substantially vertically, which is suitable for a spare wheel having a horizontal orientation. As an alternative, the bottom wall may be angled in relation to a horizontal plane, e.g. angled slightly obliquely upwards or slightly obliquely downwards. The angle of the bottom wall in relation to the horizontal plane may be in the range of +/−30 degrees, such as in the range of +/−15 degrees. The side wall forms an angle with the bottom wall, typically being above 60 degrees, usually being about 90 degrees.

The collision-sensitive object may have a substantially rectangular shape, thereby substantially forming a three-dimensional shape of a rectangular parallelepiped. However, it would also be feasible with other shapes, e.g. cylindrical.

The collision-sensitive object is carried by the carrier plate. The collision-sensitive object is attached to the carrier plate, e.g. by means of a housing enclosing the collision-sensitive object. The housing is further described below. The carrier plate is attached to the bottom wall, either directly or indirectly via another component, such as via a bottom reinforcement plate, as described below. The components are configured such that the collision-sensitive object moves together with the carrier plate in case of a rear collision.

The reinforcement structure may form an integral part of the bottom wall or it may be a structural component attached to the bottom wall. The reinforcement structure is located at the bottom wall, i.e. not located at the side wall.

The reinforcement structure is located in front of the carrier plate and/or below a front portion of the carrier plate.

The reinforcement structure is configured to stop a forward translational displacement of the carrier plate, the forward displacement being in a horizontal plane. It thus, at least initially, prevents the carrier plate from sliding straight forwards.

The reinforcement structure may further be configured to initiate an obliquely upward movement of the carrier plate and thereby also an obliquely upward movement of the collision-sensitive object during a rear collision scenario. The carrier plate may e.g. be tilted upwards at its forward end by means of the reinforcement structure, which may be in a deformed state. Hence, when the carrier plate and the collision-sensitive object are moved further forward during the rear collision scenario, they will pass over a structural component of a subframe or bodywork of the vehicle, such as a rear cross member. Thereby the problem of stack-up is reduced or preferably avoided. The tilting of the carrier plate may be within in the range of from 30 to 90 degrees as seen in relation to its original orientation, which may be horizontal.

As an alternative, the reinforcement structure may be configured to initiate an obliquely downwards movement of the carrier plate and thereby also an obliquely downwards movement of the collision-sensitive object during a rear collision scenario. In this case, the bottom wall of the spare wheel cavity may be obliquely downwards oriented, such that the bottom wall, and hence the optional spare wheel, is obliquely downwards inclined in a forward direction. Hence, when the carrier plate and the collision-sensitive object are moved further forward during the rear collision scenario, they will pass below the structural component of the subframe or bodywork, such as the rear cross member. Thereby the problem of stack-up is reduced or preferably avoided.

The bottom wall may be configured to form a first shear plane and the carrier plate may be configured to form a second shear plane, which is displaceable in a forward direction in relation to the first shear plane in case the spare wheel cavity is subjected to a forward-directed force from behind. The second shear plane is located vertically above the first shear plane, in order to allow relative shear displacement between the two shear planes. A minimum vertical difference is that the carrier plate is on top of the bottom wall as seen in a vertical direction. A practical upper limit for the vertical difference is set by the desire to have a flat trunk floor and/or to have an as high trunk volume as possible. The practical upper limit may be in the order of 100 millimetres.

The term forward-directed force is used herein to denote a force directed in a forward direction of the vehicle or in a substantially forward direction of the vehicle, such that its forward component is larger than any vertical or transverse component. Such a forward-directed force may arise in case of a rear collision involving the vehicle.

The spare wheel cavity may be configured such that the carrier plate is stopped by the reinforcement structure if the forward-directed force is less than a preselectable level, and the carrier plate is tilted and passes above the reinforcement structure if the forward-directed force is equal to or greater than the preselectable level, in case the spare wheel cavity is subjected to a forward-directed force from behind. The preselectable level of the forward-directed force is related to collision forces occurring in a high-speed collision. A high-speed collision is a collision, in which the vehicle gets so damaged that it will normally not be repaired and used again. A low-speed collision, on the other hand, is a collision in which the vehicle obtains damages of the type that normally will be repaired, such that the vehicle can be used again. Generally, low-speed collisions may be for speeds up to 25 mph, corresponding to 40 km/h, while high-speed collisions may be above 25 mph. The preselectable level is influenced by the configuration of the spare wheel cavity, in particular by the configuration of the reinforcement structure.

The collision-sensitive object moves together with the carrier plate. The tilting of the carrier plate, e.g. by tilting upwards at its forward end, initiates the obliquely upward movement of the carrier plate and thereby also an obliquely upward movement of the collision-sensitive object. Hence, when the carrier plate and the collision-sensitive object are moved further forward in the rear collision scenario, they will pass over a structural component of the subframe or bodywork, such as a rear cross member. Thereby the problem of stack-up is reduced or preferably avoided. The bottom wall and the optional bottom reinforcement plate may be subjected to deformation inter alia against the structural component, while the collision-sensitive object relatively unaffected passes the structural component.

The reinforcement structure may be formed as one or more shape elements in the bottom wall, e.g. a groove, a protrusion or a step, thus being an integral part of the bottom wall. As an alternative or a complement, a reinforcement structure forming a separate component may be mounted to the bottom wall or mounted to the side wall but in such a way that the reinforcement structure is located at the bottom wall.

The one or more shape elements are located in front of the carrier plate and/or below a front portion of the carrier plate. The rear end of the shape element may form a bending line for the bottom wall. Hence, if having more than one shape element, e.g. two or more grooves, they may end at corresponding locations as seen in the longitudinal direction of the vehicle, e.g. at a front end of the carrier plate, such that the rear ends together form a bend line of the bottom wall.

If utilizing one or more grooves, e.g. two, three or four, a depth of the groove or grooves may be in the range of 2-7 millimetres (mm), preferably in the range of 3-6 mm.

The one or more shape elements may constitute less than 30% of the surface of the bottom wall in front of the carrier plate, preferably less than 20%. Hence, a main portion of the bottom wall in front of the carrier plate may have a substantially flat surface. This may make welding of other components to the bottom wall in front of the carrier plate easier.

The shape element may have its main extension in a longitudinal direction of the spare wheel cavity. Then the extension in the longitudinal direction is larger than in a transverse direction, e.g. at least three times larger or at least five times larger.

The spare wheel cavity may further comprise a bottom reinforcement plate configured to reinforce the bottom wall. The bottom reinforcement plate may e.g. be attached to the bottom wall by welding. The bottom reinforcement plate may be used for attachment of the spare wheel and/or the collision-sensitive object. If there is a bottom reinforcement plate, the carrier plate is preferably attached to the bottom reinforcement plate, which in turn is attached to the bottom wall.

The bottom reinforcement plate may comprise a main surface, which is located vertically above the reinforcement structure in or at the bottom wall, preferably with an interspace between the main surface of the bottom reinforcement plate and the bottom wall. The interspace may be used to provide space for a spare wheel attachment means, which is partly located below the bottom reinforcement plate and passes through an opening in the bottom reinforcement plate, thereby connecting the spare wheel to the bottom reinforcement plate. In addition, the interspace makes the collision-sensitive object be located vertically above the bottom wall. The interspace may have a height being in the range of from 3 to 15 millimetres, preferably in the range of from 5 to 10 millimetres.

The bottom reinforcement plate may comprise a step shape creating the interspace between the main surface of the bottom reinforcement plate and the bottom wall. The step shape may form a border a long at least a portion of a circumference of said bottom reinforcement plate, e.g. along substantially the whole circumference.

The bottom reinforcement plate may comprise a rear portion, which protrudes in a direction towards a rear end of the vehicle, such that the rear portion extends to, or substantially extends to, a rear edge of the spare wheel cavity. Such a rear portion may help to ascertain the attachment of the collision-sensitive object.

The carrier plate may comprise a first force receiver adapted to receive a forward-directed force, the first force receiver protruding in a rearward direction from the object carrying portion of the carrier plate. The first force receiver is configured to transfer load in case of a rear collision scenario by providing a direct load path from behind.

The spare wheel cavity may comprise a housing configured to at least partly enclose the collision-sensitive object in order to protect it. The housing is sized such that the collision-sensitive object fits in it. The housing may have a substantially square or rectangular shape with rounded-off corners, thereby substantially forming a three-dimensional shape of a rectangular parallelepiped, which is suitable for a collision-sensitive object of this shape. However, it would also be feasible with other shapes of the housing and/or the collision-sensitive object, e.g. cylindrical. Purely as an example, the housing may be large enough to fit a lithium-ion battery suitable for a hybrid vehicle.

The spare wheel cavity may further comprise a second force receiver adapted to receive a forward-directed force, the second force receiver protruding in a rearward direction from the housing, preferably protruding from an upper portion or more preferably from an upper edge of the housing.

The second force receiver is configured to transfer load in case of a rear collision scenario. The second force receiver is particularly useful for the case, when there is no spare wheel present in the spare wheel cavity but only the collision-sensitive object. The second force receiver may then help to prevent too much tilting of the collision-sensitive object during at least an initial phase of a rear collision, e.g. to prevent tilting above 90 degrees. In addition or as a complement, the second force receiver may be used to protect the housing and/or the collision-sensitive object from being damaged by a lock of a trunk door during a rear collision.

The second force receiver may comprise a support connecting the second force receiver with a rear side wall of the housing. The support may be a supporting plate or a strut. The support is adapted to support the second force receiver especially in a situation wherein the housing is tilted upwards at its front end.

Disclosed herein is also an arrangement comprising the spare wheel cavity as described herein and the collision-sensitive object, wherein the collision-sensitive object is a battery, e.g. a lithium-ion battery. The battery may be stored in the housing attached to the carrier plate.

Disclosed herein is also an arrangement comprising the spare wheel cavity as described herein and a spare wheel configured to be stored in the spare wheel cavity, wherein the spare wheel comprises a wheel rim configured to encompass a housing enclosing the collision-sensitive object. The shape of the wheel rim may then be specially selected to provide appropriate space for the housing.

Disclosed herein is also a vehicle comprising the spare wheel cavity or the arrangement described herein.

Disclosed herein is also a method of reducing a risk of a stack-up problem in case of a rear collision involving a vehicle, comprising the spare wheel cavity as disclosed herein and a structural component in front of the spare wheel cavity. The method comprises: tilting the carrier plate upwards at its forward end, and displacing the carrier plate forwards in the vehicle above the structural component.

As mentioned above, the carrier plate may be stopped by the reinforcement structure as long as the forward-directed force resulting from the rear collision is less than the preselectable level. When the forward-directed force reaches the preselectable level, the carrier plate is tilted upwards at its forward end and passes above the reinforcement structure. Thereafter the carrier plate and the spare wheel are displaced forwards in the vehicle, however above the structural component, e.g. a rear cross member. The collision-sensitive object moves together with the carrier plate and optionally with the spare wheel, and thereby also passes over the structural component. Consequently, the problem of stack-up against the structural component is reduced or preferably avoided. The bottom wall may thereby form a first shear plane and the carrier plate may form a second shear plane. The bottom wall and the optional bottom reinforcement plate may be subjected to deformation inter alia against the structural component, while the collision-sensitive object relatively unaffected passes the structural component.

BRIEF DESCRIPTION OF THE DRAWINGS

The present invention will hereinafter be further explained by means of non-limiting examples with reference to the appended drawings wherein:

FIGS. 5a-d illustrate a scenario for a rear collision.

FIGS. 6a-d illustrate another scenario for a rear collision.

It should be noted that the appended drawings are schematic and that individual components are not necessarily drawn to scale and that the dimensions of some features of the present invention may have been exaggerated for the sake of clarity.

DETAILED DESCRIPTION

The invention will, in the following, be exemplified by embodiments. It should however be realized that the embodiments are included in order to explain principles of the invention and not to limit the scope of the invention, as defined by the appended claims. Details from two or more of the embodiments may be combined with each other.

Figure 1:
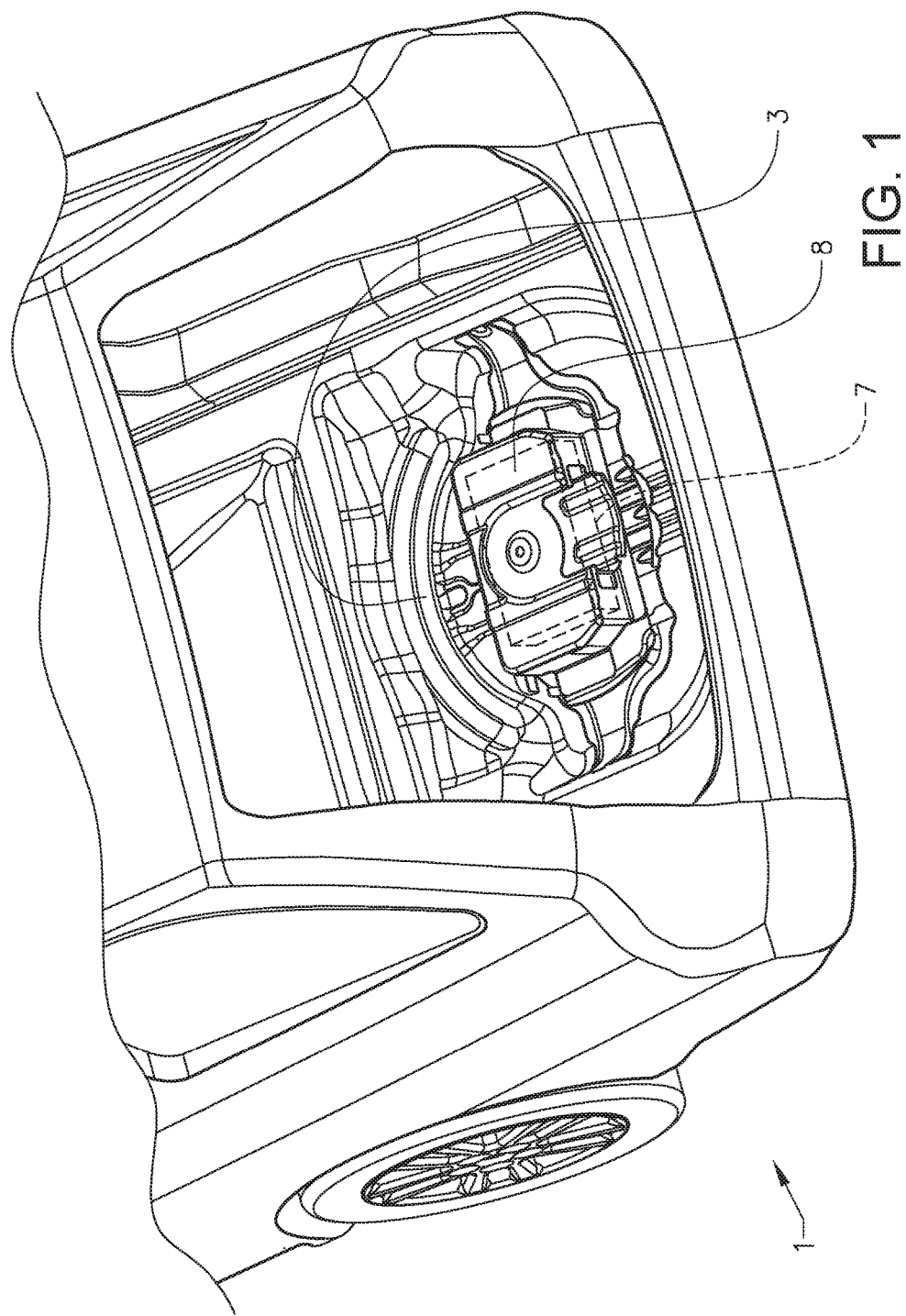
FIG. 1 illustrates a rear end portion of a vehicle with a spare wheel cavity according to the invention with a collision-sensitive object.
Figure 2:
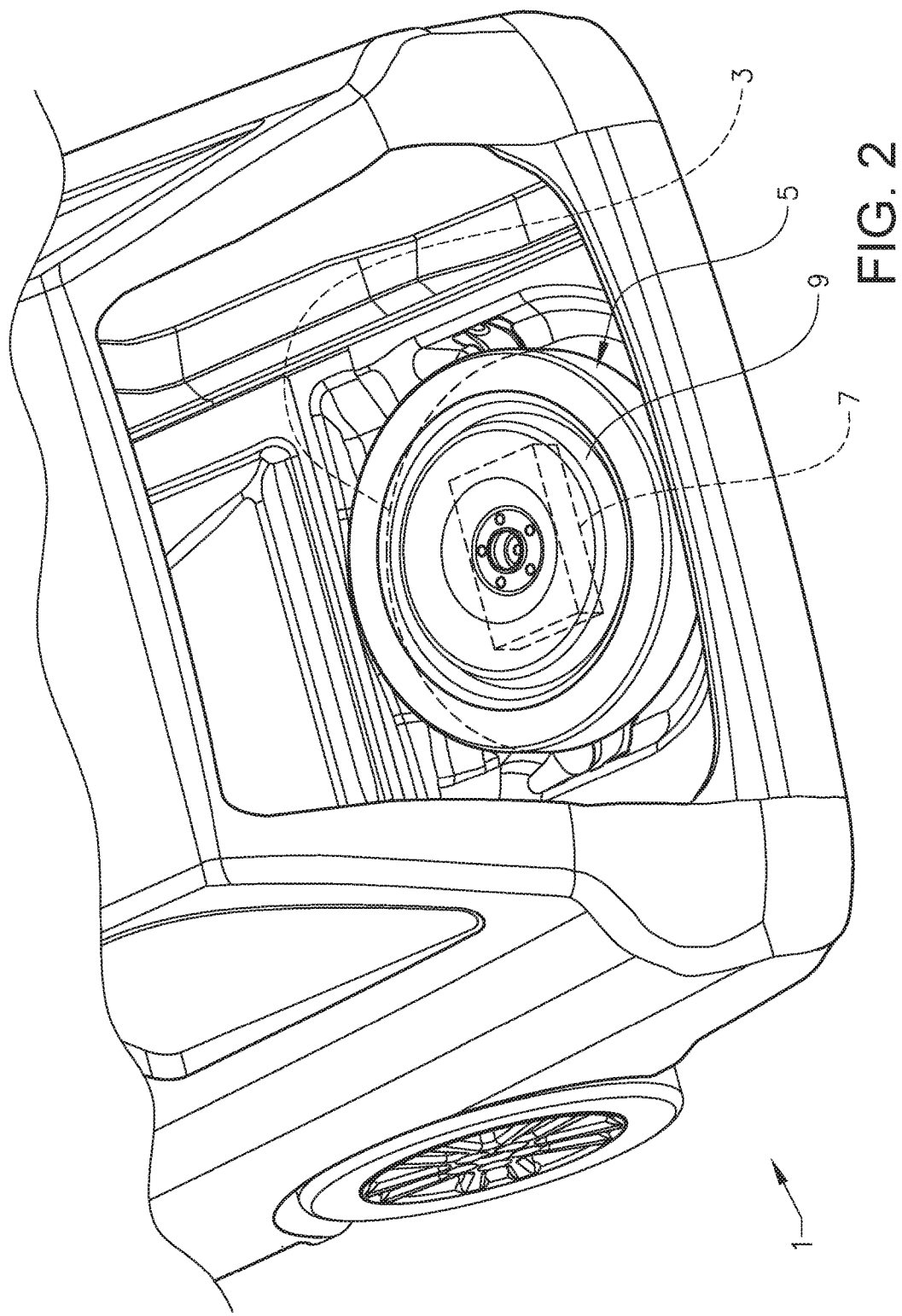
FIG. 2 illustrates a rear end portion of a vehicle with a spare wheel cavity according to the invention with a spare wheel and a collision-sensitive object.

FIGS. 1 and 2 illustrate a rear end portion of a vehicle 1 with a trunk door and a trunk floor panel removed for better visibility. The rear end portion of the vehicle 1 comprises a spare wheel cavity 3, which is configured to receive and store a spare wheel 5 in a horizontal orientation. The spare wheel cavity 3 is utilized to store a collision-sensitive object 7, e.g. a battery, such as a lithium-ion battery. The collision-sensitive object 7 may be enclosed in a protective housing 8, as is illustrated. The collision-sensitive object 7 may be stored inside a wheel rim 9 of the spare wheel 5, as in FIG. 2, or it may be stored without a spare wheel, as in FIG. 1. It would also be possible to only store the spare wheel 5 and no collision-sensitive object in the spare wheel cavity 3. Normally, although not illustrated, the spare wheel cavity 3 is covered by the trunk floor panel to provide the trunk with a flat floor.

Figure 3:
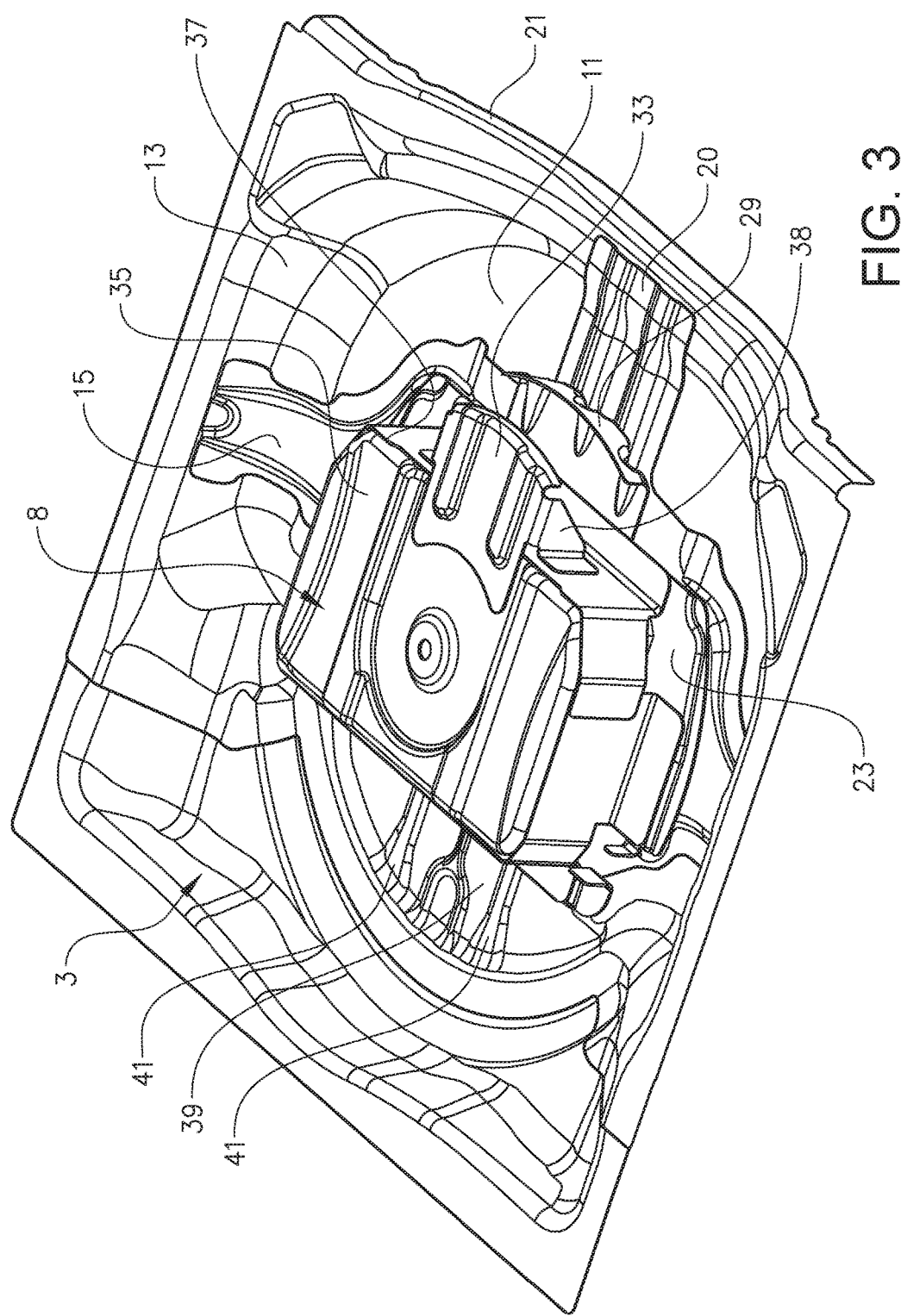
FIG. 3 illustrates a spare wheel cavity according to the invention.
Figure 4:
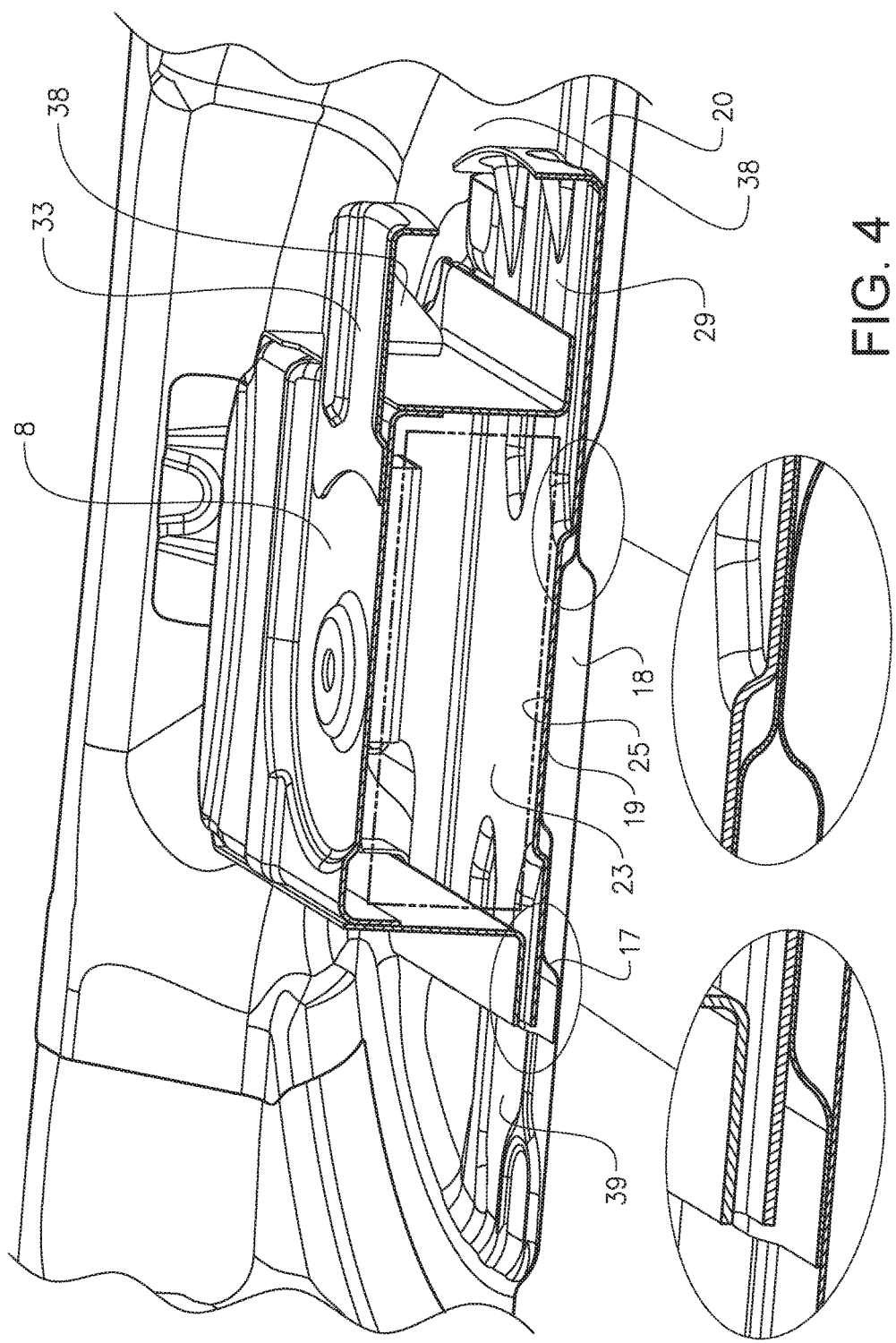
FIG. 4 illustrates a cross-sectional view of the spare wheel cavity of FIG. 3.

The spare wheel cavity 3 of FIG. 1 is illustrated with more details in FIGS. 3 and 4. FIG. 3 is a perspective view and FIG. 4 is a perspective cross-sectional view.

The spare wheel cavity 3 comprises a bottom wall 11 and a side wall 13. The side wall 13 surrounds the bottom wall 11. The housing 8 is sized such that the collision-sensitive object 7 fits in it. In the illustrated embodiments, the housing 8 has a substantially square or rectangular shape with rounded-off corners, thereby substantially forming a three-dimensional shape of a rectangular parallelepiped. Also the collision-sensitive object 7 has a substantially rectangular shape, thereby substantially forming a three-dimensional shape of a rectangular parallelepiped. However, it would also be feasible with other shapes of the housing 8 and/or the collision-sensitive object, e.g. cylindrical. The housing 8 may be large enough to fit a lithium-ion battery 7 suitable for a hybrid vehicle.

A bottom reinforcement plate 15, which is advantageous to have but which is optional, is arranged to reinforce the bottom wall 11. The bottom reinforcement plate 15 may e.g. be attached to the bottom wall 11 by welding. The bottom reinforcement plate 15 comprises a step shape 17, which creates an interspace 18 between a main surface 19 of the bottom reinforcement plate 15 and the bottom wall 11. The interspace 18 may be used to provide space for a spare wheel attachment means, which is partly located below the bottom reinforcement plate 15 and passes through an opening in the bottom reinforcement plate 15, thereby connecting the spare wheel 5 to the bottom reinforcement plate 15. In addition, the interspace 18 makes the collision-sensitive object 7 be located vertically above the bottom wall 11.

The bottom reinforcement plate 15 comprises, as an option, a rear portion 20, which protrudes in a direction towards a rear end of the vehicle 1, such that the rear portion 20 extends to, or substantially extends to, a rear edge 21 of the spare wheel cavity 3. Such a rear portion 20 may help to ascertain the attachment of the collision-sensitive object 7 in case of a low-speed collision from behind.

The spare wheel cavity 3 further comprises a carrier plate 23 configured to carry the collision-sensitive object 7 on an object carrying portion 25 of the carrier plate 23. The carrier plate 23 is attached to the bottom reinforcement plate 15 by attachment means, e.g. screws located at a respective corner of the carrier plate 23. The attachment means are preferably configured such that the carrier plate 23 is connected to the bottom reinforcement plate 15 at least during an initial phase of a rear collision scenario, as is further described below, and preferably during the whole rear collision scenario.

The carrier plate 23 comprises a first force receiver 29, adapted to receive a forward-directed force from behind. The first force receiver 29 protrudes in a rearward direction from the object carrying portion 25 of the carrier plate 23.

The term forward-directed force is used herein to denote a force directed in a forward direction of the vehicle 1 or in a substantially forward direction of the vehicle 1, such that its forward component is larger than any vertical or transverse component. Such a forward-directed force may arise in case of a rear collision involving the vehicle 1.

The housing 8 encloses and protects the collision-sensitive object 7, illustrated as the lithium-ion battery. The housing 8 is attached to the object carrying portion 25 of the carrier plate 23 by attachment means, e.g. screws. The attachment means of the housing 8 are configured such that the housing 8 will remain attached to the carrier plate 23 during a rear collision scenario.

A second force receiver 33, adapted to receive a forward-directed force from behind, protrudes in a rearward direction from the housing 8, i.e. parallel to the first force receiver 29. The second force receiver 33 protrudes from an upper portion 35 of the housing 8, preferably from an upper edge 37 of the housing 8 as is illustrated, and is further connected to a rear side wall of the housing 8 by means of support plates 38 extending vertically. The second force receiver 33 may help to prevent too much tilting, e.g. above 90 degrees, of the collision-sensitive object 7 during at least an initial phase of a rear collision, as is further described below in conjunction with FIGS. 5a-d, illustrating the case with no spare wheel present.

A reinforcement structure 39 is located in the bottom wall 11 in front of the carrier plate 23. The reinforcement structure 39 is configured to at least initially stop a straight forward translational displacement of the carrier plate 23 and to initiate an obliquely upward movement of the carrier plate 23 and thereby also an obliquely upward movement of the collision-sensitive object 7 enclosed in the housing 8 in case of a rear collision scenario. In the illustrated embodiment, the reinforcement structure 39 is formed as a shape element in the bottom wall 11, illustrated as two grooves 41 in the bottom wall 11. The grooves 41 extend in a longitudinal direction of the spare wheel cavity 3 and hence in a longitudinal direction of the vehicle 1. The grooves 41 constitute less than 20% of the surface portion of the bottom wall 11 being located in front of the carrier plate 23. The grooves 41 end at corresponding locations as seen in the longitudinal direction of the vehicle 1, here at a front end of the carrier plate 23, such that the rear ends of the grooves 41 together form a bend line of the bottom wall 11.

As an alternative or a complement to the shape element, however not illustrated, a reinforcement structure forming a separate component may be mounted at the bottom wall 11 or in mounted at the side wall 13 but in such a way that it is located at the bottom wall 11.

The spare wheel cavity 3 is configured such that, in case the spare wheel cavity 3 is subjected to a forward-directed force from behind, the carrier plate 23 is stopped by the reinforcement structure 39 if the forward-directed force is less than a preselectable level However, if the forward-directed force is equal to or greater than the preselectable level, the reinforcement structure 39 initiates an obliquely upward movement of the carrier plate 23, which rises to pass over the reinforcement structure 39, by tilting the carrier plate 23 at its forward end. The preselectable level is related to collision forces occurring in a high-speed collision. As is further described below in conjunction with FIGS. 5a-d and 6a-d, the carrier plate 23 thereafter also passes over a structural component of the vehicle 1, illustrated as a rear cross member 43 extending in a transverse direction of the vehicle 1 in front of the spare wheel cavity 3. The rear cross member 43 is a structural component comprised in a subframe or bodywork of the vehicle 1. The housing 8 with its enclosed collision-sensitive object 7 moves together with the carrier plate 23 and thereby also passes over the rear cross member 43 of the vehicle 1. In that case, the bottom wall 11 forms a first shear plane and the carrier plate 23 forms a second shear plane, which is displaceable in a forward direction in relation to the first shear plane. Thereby the problem of stack-up is reduced or preferably avoided.

FIGS. 5a-d and FIGS. 6a-d illustrate two different scenarios for a rear collision involving the vehicle 1, both being high-speed collisions. The housing 8 encloses the collision-sensitive object 7, illustrated as the lithium-ion battery. There is no spare wheel present in the rear collision scenario of FIGS. 5a-d, while the spare wheel 5 is present in the scenario of FIGS. 6a-d. It would also be possible, however not illustrated, to have a scenario with only the spare wheel 5 present, and no housing 8 or collision-sensitive object 7.

If utilizing a spare wheel cavity according to prior art, there would be a risk in case of a rear collision that the collision-sensitive object would get stuck against the cross member 43, thereby potentially causing a stack-up. However, this risk is reduced, or avoided, with the spare wheel cavity 3 as described herein.

FIG. 5a illustrates a simplified cross-section of FIG. 1 taken along a longitudinal centre-line of the spare wheel cavity 3. As mentioned above, the carrier plate 23 is stopped by the reinforcement structure 39 as long as the forward-directed force is less than a preselectable level. When the forward-directed force reaches the preselectable level, the carrier plate 23 rises by being tilted upwards at its forward end. See FIG. 5b. Thereafter the carrier plate 23 is displaced forwards in the vehicle 1 above the reinforcement structure 39, see FIG. 5c, and above the rear cross member 43, see FIG. 5d. The tilting of the carrier plate 23 may be within in the range of from 30 to 90 degrees as seen in relation to its original orientation. The housing 8 with its enclosed collision-sensitive object 7 moves together with the carrier plate 23 and thereby also passes over the rear cross member 43. Thereby the problem of stack-up is reduced or preferably avoided. The bottom wall 11 forms a first shear plane and the carrier plate 23 forms a second shear plane. The bottom wall 11 and the bottom reinforcement plate 15, in particular at the step shape 17, are subjected to deformation inter alia against the rear cross member 43, while the housing 8, the collision-sensitive object 7 and the carrier plate 23 relatively unaffected pass over the rear cross member 43.

The forward-directed load from the rear collision is taken up by load paths via the first force receiver 29 and the second force receiver 33, which help to guide the displacement of the collision-sensitive object 7. Further, the second force receiver 33 prevents the collision-sensitive object 7 from too much tilting, e.g. above 90 degrees, during the rear collision scenario. In addition or as a complement, the second force receiver 33 may be used to protect the housing 8 and thus the collision-sensitive object 7 from being damaged by a lock of the trunk door.

FIGS. 6a-d illustrate the corresponding scenario in case the spare wheel 5 is present. FIG. 6a illustrates a simplified cross-section of FIG. 2 taken along a longitudinal centre-line of the spare wheel cavity 3. The wheel rim 9 has a shape configured to fit the housing 8 inside. Thereby the spare wheel 5 will help to protect the collision-sensitive object 7 in case of a rear collision.

The forward-directed load from the rear collision is initially taken by the spare wheel 5, which transfers it to the carrier plate 23 via the first force receiver 29. Similar as for the scenario of FIGS. 5a-d, the carrier plate 23 is stopped by the reinforcement structure 39 as long as the forward-directed force is less than the preselectable level. When the forward-directed force reaches the preselectable level, the carrier plate 23 rises by being tilted upwards at its forward end together with the spare wheel 5. See FIG. 6b. Thereafter the carrier plate 23 and the spare wheel 5 are displaced forwards in the vehicle 1 above the reinforcement structure 39, see FIG. 6c, and above the rear cross member 43, see FIG. 6d. The housing 8 with its enclosed collision-sensitive object 7 moves together with the carrier plate 23 and the spare wheel 5, and thereby also passes over the rear cross member 43. Consequently, the problem of stack-up is reduced or preferably avoided. The bottom wall 11 forms a first shear plane and the carrier plate 23 forms a second shear plane. The bottom wall 11 and the bottom reinforcement plate 15, in particular at the step shape 17, are subjected to deformation inter alia against the rear cross member 43, while the housing 8, the collision-sensitive object 7, the spare wheel 5 and the carrier plate 23 relatively unaffected pass over the rear cross member 43.

Further modifications of the invention within the scope of the appended claims are feasible. As such, the present invention should not be considered as limited by the embodiments and figures described herein. Rather, the full scope of the invention should be determined by the appended claims, with reference to the description and drawings.

For example, the skilled person understands that the spare wheel cavity as disclosed herein is highly versatile and would work with or without the collision-sensitive object, as well as, with or without the spare wheel. Hence the same kind of configuration of the spare wheel cavity may be used for vehicles being equipped in different ways.

The illustrated embodiments disclose a lithium-ion battery. This kind of battery may be more sensitive to mechanical damage than a conventional lead acid battery and would thus highly benefit from the spare wheel cavity as described herein, in case the vehicle would be subjected to a rear collision.

The invention claimed is:

1. A spare wheel cavity for a vehicle, said spare wheel cavity configured to store a collision-sensitive object, said spare wheel cavity comprising:
   a bottom wall,
   a side wall,
   a carrier plate directly or indirectly attached to said bottom wall, said carrier plate configured to carry said collision-sensitive object on an object carrying portion of said carrier plate, and
   a reinforcement structure located in or at said bottom wall in front of said carrier plate, in relation to a forward direction of the vehicle when the spare wheel cavity is mounted in the vehicle, and/or below a front portion of said carrier plate,
   wherein said bottom wall is configured to form a first shear plane and said carrier plate is configured to form a second shear plane, which is displaceable in a forward direction in relation to said first shear plane in case said spare wheel cavity is subjected to a forward-directed force from behind.

2. The spare wheel cavity according to claim 1, wherein, when said spare wheel cavity is subjected to a forward-directed force from behind, said spare wheel cavity is configured such that:

said carrier plate is stopped by said reinforcement structure if said forward-directed force is less than a preselectable level, and said carrier plate is tilted and passes above said reinforcement structure if said forward-directed force is equal to or greater than said preselectable level.

3. The spare wheel cavity according to claim 1, wherein said reinforcement structure is formed as one or more shape elements in said bottom wall comprising a groove, a protrusion or a step.

4. The spare wheel cavity according to claim 3, wherein said one or more shape elements constitute less than 30% of the surface of said bottom wall in front of said carrier plate.

5. The spare wheel cavity according to claim 3, wherein said one or more shape elements constitute less than 20% of the surface of said bottom wall in front of said carrier plate.

6. The spare wheel cavity according to claim 3, wherein at least one of said shape elements has its main extension in a longitudinal direction of said spare wheel cavity.

7. The spare wheel cavity according to claim 1, wherein said spare wheel cavity further comprises a bottom reinforcement plate configured to reinforce said bottom wall.

8. The spare wheel cavity according to claim 7, wherein said bottom reinforcement plate comprises a main surface, which is located vertically above said reinforcement structure in or at said bottom wall.

9. The spare wheel cavity of claim 8, further comprising an interspace between said main surface of said bottom reinforcement plate and said bottom wall.

10. The spare wheel cavity according to claim 9, wherein said bottom reinforcement plate comprises a step shape creating said interspace between said main surface of said bottom reinforcement plate and said bottom wall.

11. The spare wheel cavity according to claim 1, wherein said carrier plate comprises a first force receiver adapted to receive a forward-directed force, said first force receiver protruding in a rearward direction from said object carrying a portion of said carrier plate.

12. The spare wheel cavity according to claim 1, further comprising:
a housing configured to at least partly enclose said collision-sensitive object.

13. The spare wheel cavity according to claim 12, further comprising:
a second force receiver adapted to receive a forward-directed force, said second force receiver protruding in a rearward direction from said housing.

14. The spare wheel cavity according to claim 13, wherein the second force receiver protrudes from an upper portion or an upper edge of said housing.

15. An arrangement comprising said spare wheel cavity according to claim 1 and further comprising said collision-sensitive object, wherein said collision-sensitive object is a battery.

16. An arrangement comprising said spare wheel cavity according to claim 1 and further comprising:
a spare wheel configured to be stored in said spare wheel cavity, wherein said spare wheel comprises a wheel rim configured to encompass a housing enclosing said collision-sensitive object.

17. A method of reducing a risk of a stack-up problem in case of a rear collision involving a vehicle comprising said spare wheel cavity according to claim 1 and a structural component located in front of said spare wheel cavity, said method comprising:
tilting said carrier plate upwards at its forward end, and
displacing said carrier plate forwards in said vehicle above said structural component.

* * * * *